No. 839,998. PATENTED JAN. 1, 1907.
H. C. JOERDEN.
BIFOCAL LENS.
APPLICATION FILED MAR. 15, 1906.
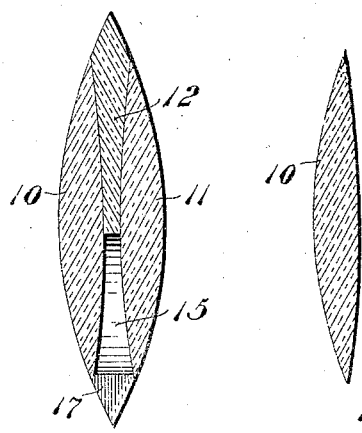
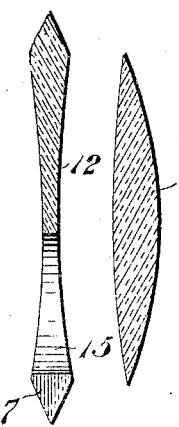
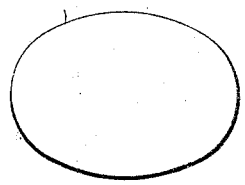
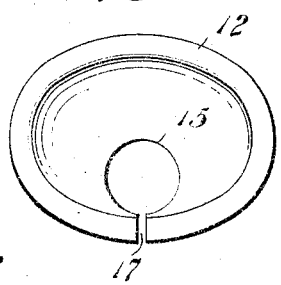
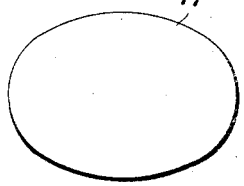
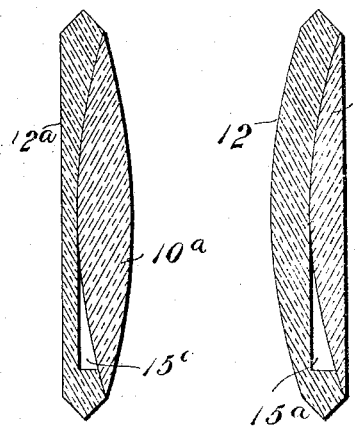
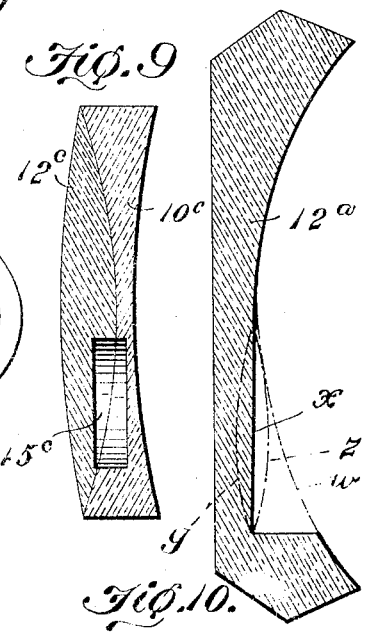
Henry C. Joerden
INVENTOR.
WITNESSES:
By C. A. Snow & Co.
ATTORNEYS

UNITED STATES PATENT OFFICE.

HENRY C. JOERDEN, OF MARLING, MISSOURI.

BIFOCAL LENS.

No. 839,998.
Specification of Letters Patent.
Patented Jan. 1, 1907.

Application filed March 13, 1906. Serial No. 305,836.

*To all whom it may concern:*

Be it known that I, HENRY C. JOERDEN, a citizen of the United States, residing at Marling, in the county of Montgomery and State of Missouri, have invented a new and useful Bifocal Lens, of which the following is a specification.

This invention relates to bifocal lenses, and has for one of its objects to provide a lens having a smooth external surface in order to avoid irritating the eye or cutting the lashes.

A further object of the invention is to provide a bifocal lens which may be accurately made by an ordinary optician with the utmost accuracy and at comparatively small cost.

A still further object of the invention is to provide a bifocal lens having a perfectly smooth exterior surface.

A still further object of the invention is to provide a bifocal lens having a chromatic distant vision.

A still further object of the invention is to provide a bifocal lens that is clear and free from cement or similar holding material in the line of either the distant or reading focus.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a sectional elevation, on an exaggerated scale, of a bifocal lens constructed in accordance with the invention. Fig. 2 is a similar view of the three lens members detached. Fig. 3 is a face view of the outer lens. Fig. 4 is a similar view of the central lens. Fig. 5 is a face view of the inner lens. Fig. 6 illustrates a slight modification of the construction of the center lens. Figs. 7, 8, 9, and 10 are sectional views corresponding to Fig. 1 and illustrating modifications of the invention.

Similar numerals of reference are employed to indicate corresponding parts throughout the several figures of the drawings.

The lens forming the subject of the invention is one of that class employed for distant vision, and for ordinary purposes, such as reading, and in carrying the invention into effect three separate lenses are formed.

The two outer lenses 10 and 11 are convex, and they may be biconvex or plano-convex and of any curvature desired in accordance with the refractive power called for in the prescription. These two lenses are usually formed of crown-glass, and between them is placed a concave lens 12, which in accordance with the refraction desired will be more or less concave and may be either biconcave or plano-concave.

It is well known that where a concave lens is placed adjacent to one or more convex lenses the refractive power of the latter is reduced and the central lens is therefore so ground that the focal distance of the entire lens may be altered as required for distant vision. At a point at or near the lower edge of the central lens is formed an opening 15, which may be of the character shown in Fig. 4 or which may be formed as shown in Fig. 6. At the point where this opening is formed there is no subtraction of the power of the convex lenses 10 and 11, and the latter may therefore be employed for reading or close work when the line of vision is directed through the opening. As all of the portions around the wall of the opening include the concaved or reducing lens, the focal length is increased for distant vision whenever the eyes are raised or directed to one side of the opening. The three lenses are secured together in the usual manner; but a small slit 17 is formed in the lower portion of the central lens in order to permit expulsion of air as the lenses are forced together, so that there will be no danger of subsequent breakage due to expansion of air in case the lens is heated. By preference, the air within the space formed by said opening is withdrawn and the opening sealed at the slit 17, so that it becomes impossible for air, dirt, or moisture to enter.

In the construction shown in Fig. 6 the opening is continued down to the lower edge of the central lens in place of forming the narrow slit 17.

Inasmuch as the different focal lengths are secured by difference in the thickness of the lens at different points, it is obvious that further modifications of the invention may be made. One of these is illustrated in Fig. 7, wherein an ordinary form of plano-concave lens 12ª is provided with a recess 15ª, that is formed by grinding in from the concaved side of the lens by a circular or other suitable form of grinder. The quantity of material removed from the concaved side of the lens will depend altogether on the nature of the case under treatment.

Fig. 10 illustrates, on an enlarged scale, the manner in which the grinding away of portions of the concaved lens may be accomplished. The ordinary form of lens is indicated by the line w, and the lens in the majority of cases will be ground out to the line x. In order to meet certain conditions of the eye, the grinding may be carried on to the point y to form a concaved side at this point. To meet other conditions, the convex side z may be formed. Against this may be fitted a convex outer lens 10ª. The result is a bifocal lens that is smooth and has uninterrupted outer faces. The invention may also be applied to periscopic lenses of the type shown, for instance, in Fig. 8, wherein the concaved lens is ground out in order to decrease the refractive power in the plane of the short or reading focus. Fig. 9 illustrates a construction in which a biconvex lens 10ᶜ and a biconcaved lens 12ᶜ are employed, and both of these are reduced in thickness to form a chamber 15ᶜ.

The lens may be further modified without departing from the invention, which includes broadly all bifocal lenses in which the difference in focal lengths is secured by altering the thickness of glass for the different foci.

I claim—

1. A compound bifocal lens including an incomplete member, the incomplete portion being protected by another member of the lens.

2. A compound bifocal lens including an incomplete concave member, the incomplete portion being protected by another member of the lens.

3. A bifocal lens comprising a plurality of lens members, one of which is provided with an opening or recess, the opening being covered by another member of the lens.

4. A compound bifocal lens comprising an intermediate incomplete concaved member and outer convex members.

5. A compound bifocal lens comprising outer convex members, and an intermediate concave member, a portion of which is cut away to decrease the focal distance of the lens for near vision.

6. A compound lens comprising outer members one of which is convex, and a central concaved member, the latter being provided with an opening at its lower central portion.

7. A compound lens including a central member having an opening forming a vacuum-chamber.

8. A compound lens including a central member having an opening, there being a slit extending from the opening to the edge of the lens to permit exhausting the air from the opening when the lens members are assembled.

In testimony that I claim the foregoing as my own I have hereto affixed my signature in the presence of two witnesses.

HENRY C. JOERDEN.

Witnesses:
T. F. JONES,
W. S. TRAINER.